(12) United States Patent
Suzuki et al.

(10) Patent No.: US 7,568,077 B2
(45) Date of Patent: Jul. 28, 2009

(54) INFORMATION PROCESSING APPARATUS AND FILE CONTROLLER

(75) Inventors: Takayuki Suzuki, Machida (JP); Satoru Kashiwada, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 390 days.

(21) Appl. No.: 11/358,136

(22) Filed: Feb. 22, 2006

(65) Prior Publication Data

US 2007/0094459 A1    Apr. 26, 2007

(30) Foreign Application Priority Data

Oct. 21, 2005    (JP)    ............... 2005-307332

(51) Int. Cl.
G06F 12/00    (2006.01)
G06F 13/00    (2006.01)
G06F 13/28    (2006.01)

(52) U.S. Cl. .................. 711/156; 711/154; 711/173; 711/147; 358/400; 358/468

(58) Field of Classification Search .................. 711/156
See application file for complete search history.

(56) References Cited

U.S. PATENT DOCUMENTS

| 5,481,374 | A | | 1/1996 | Tachibana et al. |
| 5,483,353 | A | * | 1/1996 | Kudou ........................ 358/404 |
| 5,548,711 | A | * | 8/1996 | Brant et al. ...................... 714/5 |
| 6,125,423 | A | * | 9/2000 | Yamada ....................... 711/103 |
| 6,816,165 | B1 | * | 11/2004 | Radke ........................ 345/567 |

FOREIGN PATENT DOCUMENTS

| JP | 02-310664 | 12/1990 |
| JP | 04-362766 | 12/1992 |
| JP | 2000-003302 | 1/2000 |
| JP | 2000-148576 | 5/2000 |
| JP | 2000-318265 | 11/2000 |
| JP | 2004-178374 | 6/2004 |

OTHER PUBLICATIONS

European Search Report dated Apr. 17, 2007.
Office Action issued from the Japanese Patent Office, dated Oct. 23, 2008, in Japanese Patent Application No. 2005-307332 (5 pages) and English language translation thereof (5 pages).

(Continued)

Primary Examiner—Kevin L Ellis
Assistant Examiner—Prasith Thammavong
(74) Attorney, Agent, or Firm—Finnegan, Henderson, Farabow, Garrett & Dunner, L.L.P.

(57) ABSTRACT

An information processing apparatus, including: a file memory to store data; a file controller to access the file memory; a first control section to manage the file memory via the file controller; and a second control section connected with the file controller; wherein the file controller includes an usage information management section to manage information representing un-use condition in each divided region of the file memory, and wherein the information processing apparatus further includes a data storing control section to store data in the file memory from the second control section via the file controller by referring the information when the first control section is in un-operative condition.

6 Claims, 11 Drawing Sheets

OTHER PUBLICATIONS

Office Action issued from the Japanese Patent Office, dated Oct. 23, 2008, in Japanese Patent Application No. 2005-307332 (5 pages) and English language translation thereof (5 pages).

Office Action issued from the Japanese Patent Office, dated Jan. 29, 2009, in Japanese Patent Application No. 2005-307332 (4 pages) and English language translation thereof (4 pages).

* cited by examiner

INFORMATION PROCESSING APPARATUS AND FILE CONTROLLER

RELATED APPLICATION

This application is based on Japanese Patent Application No. 2005-307332 filed with Japan Patent Office on Oct. 21, 2005, the entire content of which is hereby incorporated by reference.

BACKGROUND

1. Field of the Technology

The present invention relates to information processing apparatuses configured to transmit and receive data via file memories among a plurality of control sections and to file controllers that control the access to file memories.

2. Description of the Related Art

The facsimile apparatus in recent years are configured by separating the apparatus into a main body control section and a facsimile control section from the point of view of reducing the power consumption, and during the standby state, the main body control section that is not related to incoming call detection, etc., is switched to the power saving mode.

Figure 12:
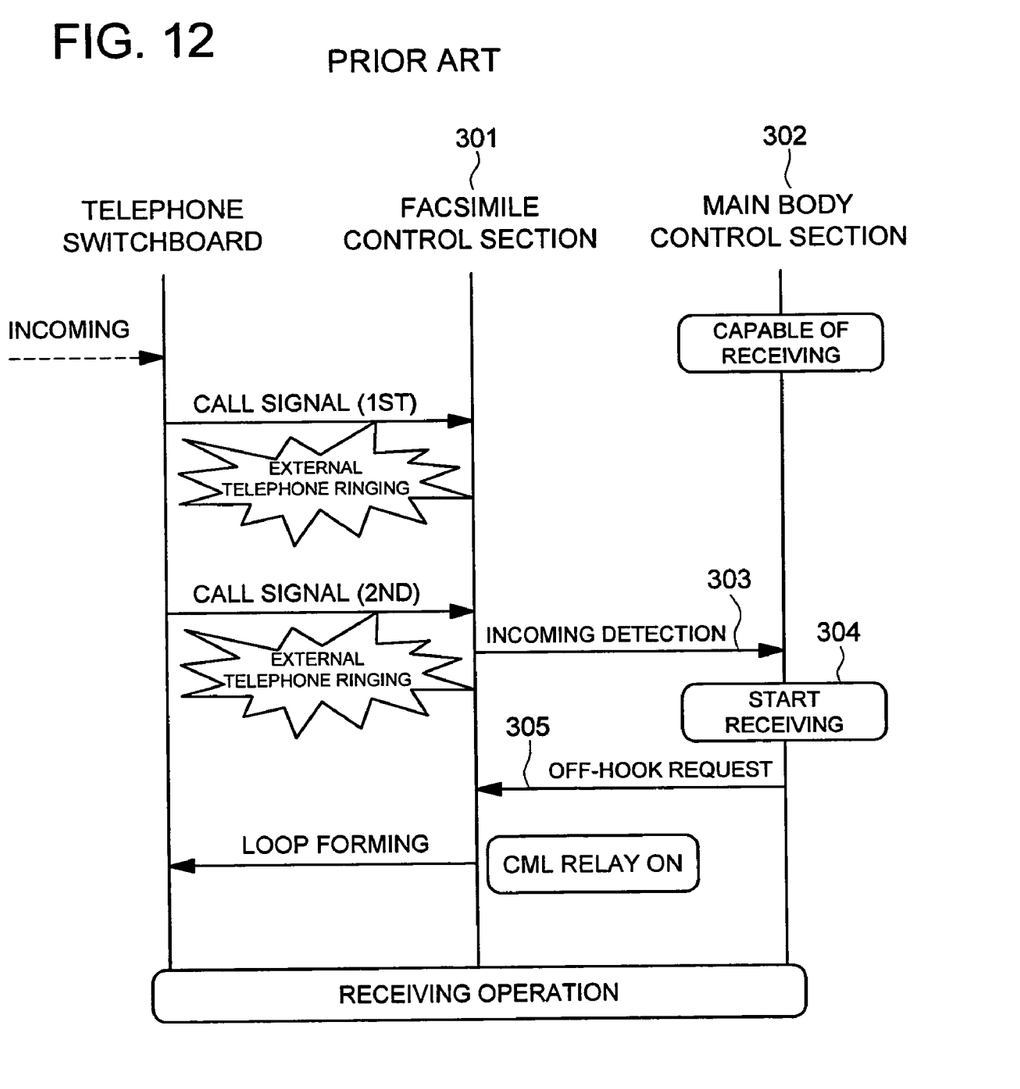
FIG. 12 is an explanatory diagram showing the timing of normal incoming call detection in a conventional facsimile apparatus that is being conventionally used.

In such a facsimile apparatus, when there is an incoming call in the normal state when both the main body control section and the facsimile control section are operating, as is shown in FIG. 12, an incoming detection 303 is posted to the main body control section 302 from the facsimile control section 301 at the instant when the ringing signal sent from the telephone exchange side is detected for a set number times (for example, two times). Upon receiving this notification, the main body control section 302, if the apparatus is in a state of being able to carry out facsimile reception with no problems such as paper tray empty or memory full, etc., immediately starts the reception process 304, and sends an off-hook request (enable reception) 305 to the facsimile control section 301. Upon receiving this request, the facsimile control section 301 completes the DC loop and starts the facsimile reception operation. Therefore, if an external telephone instrument has been connected to the facsimile apparatus, it stops ringing after the set number of times of ringing, and immediately thereafter the facsimile receiving operation is started.

Figure 13:
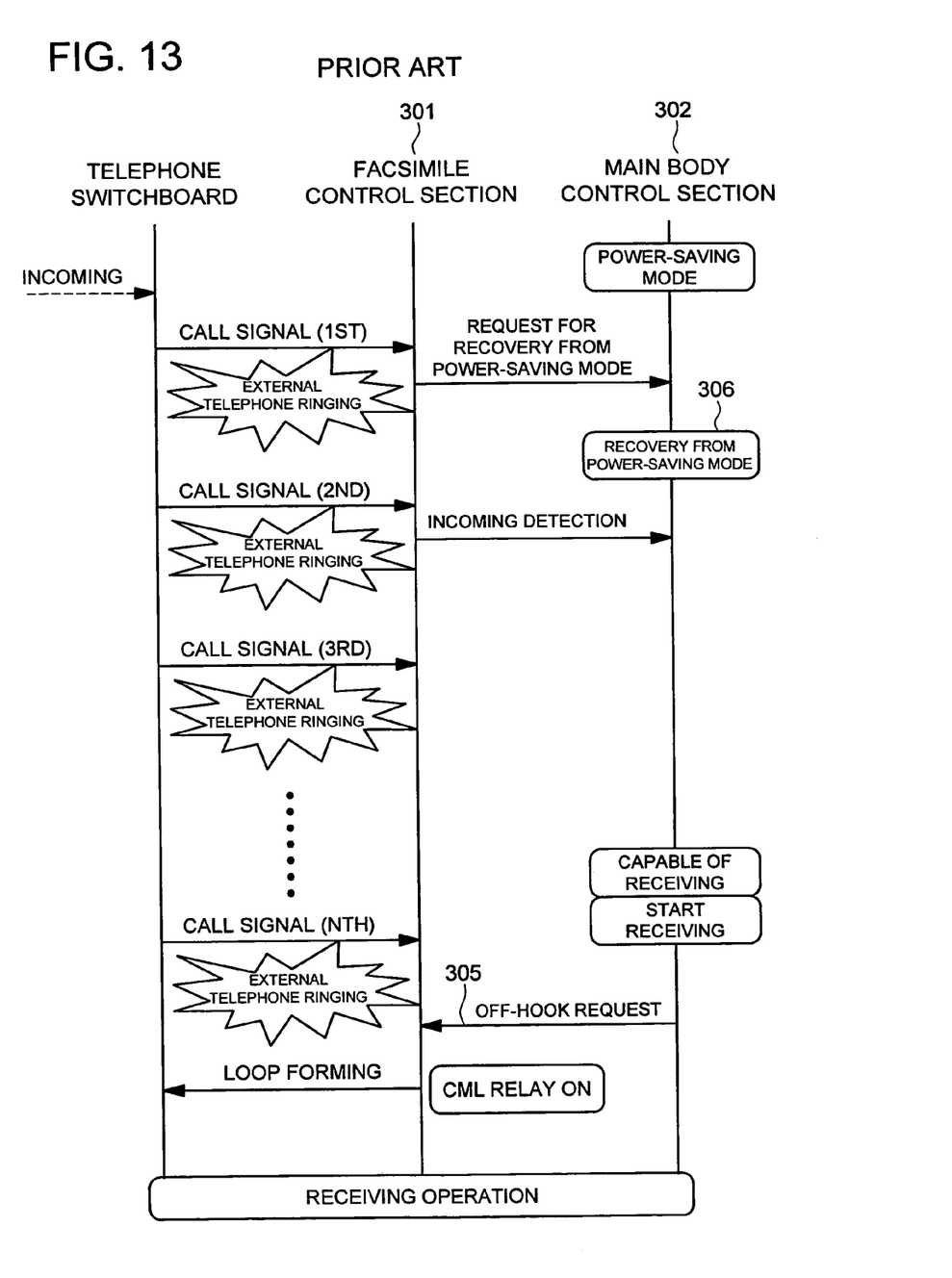
FIG. 13 is an explanatory diagram showing the timing of incoming call detection during the power saving mode of a conventional facsimile apparatus that is being conventionally used.

On the other hand, as is shown in FIG. 13, if an incoming call arrives when the main body control section 302 is in the power saving mode, with that arrival of an incoming call the main body control section 302 starts the recovery operation 306 from the power saving mode, and after the preparations for reception are completed an off-hook request (enable reception) 305 is sent to the facsimile control section 301. Therefore, if a long time (for example 30 seconds) is required until the main body control section 302 recovers from the power saving mode and until the preparations for reception are completed, there was the problem that the external telephone continues to ring more than the set number of times giving a baffling impression to the user and disturbing the peace in the working environment unnecessarily.

Although the above problem can be solved if the facsimile control section can independently start the reception operation even when the main body control section has entered the power saving mode, the data received by the facsimile control section operating independently will in anyway have to be handed over to the main body control section after it recovers from the power saving mode.

A typical method of exchanging data among a plurality of control sections is that of using a common memory. For example, there is a technique of connecting a common memory under a memory controller connected between two processors and of adjusting the contention for access to that common memory from the two processors using a memory controller (see, for example, Patent Document 1).

Patent Document 1: Japanese Unexamined Patent Application Publication No. 2000-3302

Since a memory controller of the above type only adjusts the access contention, it is necessary to exchange between control sections the control information related to the status of available area within the common memory or that related to the address and the type of data stored by the other control section, and hence the interface between control sections had become complex.

In particular, under conditions such as the main body control section being in the power saving mode when one of the control sections has stopped operating, since it is not possible to exchange control information between control sections in real time, it is necessary to carry out the processing so as to exchange control information before one control section stops operating or after it has recovered from the halted state, and hence the interface between control sections becomes even more complex.

Further, as another method of exchanging data among a plurality of control sections, it is possible to consider the method of providing in each control section a memory that can be used even when the other control sections has stopped operating, and transferring data between the memories according to the need. However, the facsimile apparatuses or multi-functional apparatus in recent years carry out management of image data using a file system under the OS (operating system). Therefore, if a separate file system is provided in the main body control section and in the facsimile control section, the processing of transferring the received data stored during stand-alone operation by the facsimile control section, while the main body control section has stopped operating, to the main body control section becomes a data transfer between file systems managed by different OS, and the control becomes complex for obtaining matching between different OS. In addition, since memory for storing the received data is provided on both sides, there is a problem of increased cost.

The present invention is intended to solve the above problems, and the object of the present invention is to provide information processing apparatuses and file controllers that, although the interface between control sections related to the management of the common memory is simple, permit one control section to independently access, the common memory while the other control section has stopped operating, and also, that permit managing the data in the common memory as files.

SUMMARY

In view of foregoing, an object of this invention is to solve at least one of the problems, and to provide new information processing apparatus. The apparatus comprises a file memory to store data;

a file controller to access the file memory;

a first control section to manage the file memory via the file controller; and a second control section connected with the file controller;

wherein the file controller includes an usage information management section to manage information representing un-use condition in each divided region of the file memory, and wherein the information processing apparatus further comprises a data storing control section to store data in the file memory from the second control section via the file controller by referring the information when the first control section is in un-operative condition.

According to another aspect of the present invention, the apparatus comprises
a file memory to store data;
a file controller to access the file memory;
a first control section to manage the file memory via the file controller; and
a second control section connected with the file controller;
wherein the file controller includes
an usage information management section to manage information representing un-use condition in each divided region of the file memory, and
an address translation section to show the divided regions under the un-use condition as continuous region for the second control section based on the information.

According to another aspect of the present invention, the apparatus comprises
a file memory to store data;
a file controller to access the file memory;
a first control section to manage the file memory via the file controller; and
a second control section connected with the file controller;
wherein the file controller includes
an usage information management section to manage information representing un-use condition in each divided region of the file memory, and
an address translation section to translate address signals inputted from second control section based on the information when the second control section stores the data in the file memory via the file controller.

According to another aspect of the present invention, the apparatus comprises
a file memory to store data;
a file controller to access the file memory;
a first control section to manage the file memory via the file controller; and
a second control section connected with the file controller;
wherein the file controller includes a register to store information representing un-use condition in each divided region of the file memory, and
wherein information processing apparatus further comprises a data storing control section to store the data in the file memory from the second control section via the file controller by referring the information when the first control section is under un-operative condition.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Various preferred embodiments of the present invention are described below with-reference to the drawings.

Figure 1:
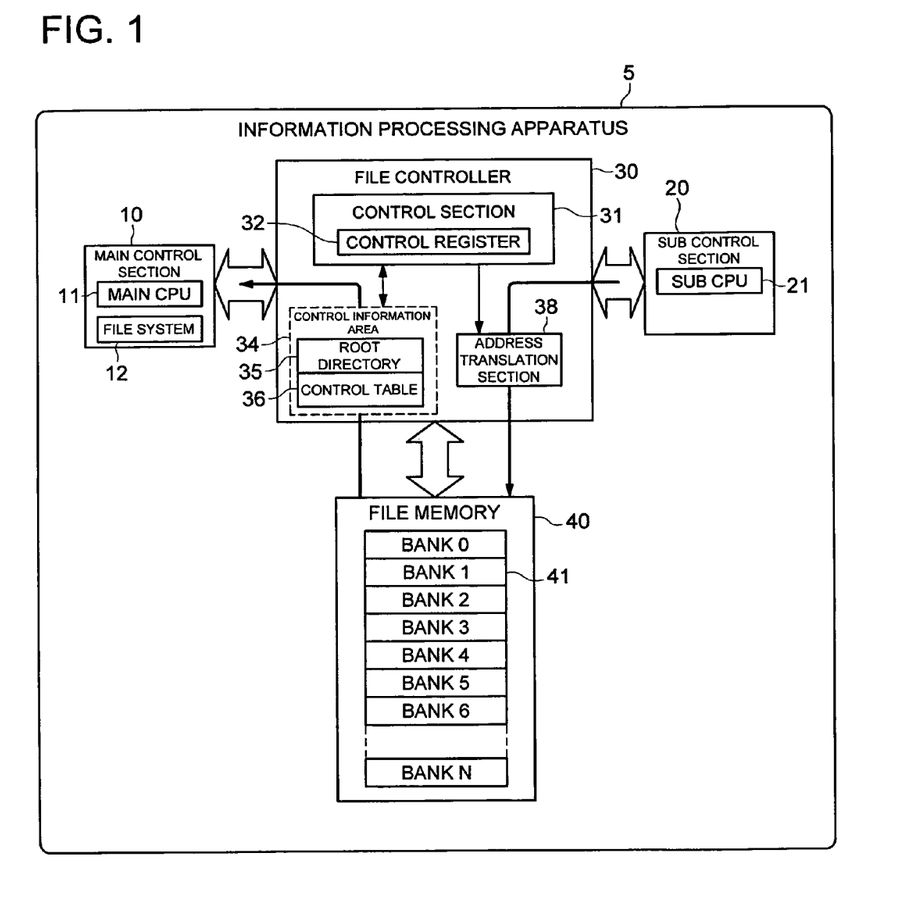
FIG. 1 is a block diagram showing an outline configuration of the information processing apparatus according to the first preferred embodiment of the present invention.

FIG. 1 is a block diagram showing an outline configuration of the information processing apparatus 5 according to the first preferred embodiment of the present invention. The information processing apparatus 5 is provided with a main control section 10, a sub control section 20, a file controller 30 connected to these, and a file memory 40 connected below the file controller 30. The information processing apparatus 5 carries out data exchange between the main control section 10 and the sub control section 20 via the file memory 40.

The file controller 30 carries out the function of executing data read and write by accessing the file memory 40. The main control section 10 is provided with a main CPU. 11 that carries out the function as the first control section that controls the file memory 40 via the file controller 30, and controls the data stored in the file memory 40 as a file by using file system 12 under the control of predetermined operating system.

The file controller 30 manages the storage area of the file memory 40 in terms of a plurality of divided regions 41 (hereinafter referred to as banks) in order to be compatible with control by the file system 12. In FIG. 1, the file memory 40 has been divided into several banks from Bank 0 to Bank n (where n is any arbitrary integer). One bank is set as, for example, 512 bytes. Here, the capacity of the file memory 40 has been assumed as 16 Mega bytes. The size of a bank and the capacity of the file memory 40 need not be restricted to these values and can be set suitably. The usual semiconductor memories are used for the file memory 40. The main control section 10, by using the file system 12, can handle a plurality of banks that are present physically at discontinuous locations as a logically connected file.

The sub control section 20 is provided with a sub CPU 21 as the second control section. The sub CPU 21, by accessing the file memory 40 via the file controller 30, can use the file memory 40 as an ordinary memory (memory with a contiguous address space).

The file controller 30 is provided with a control section 31, a control information area 34, and an address translation section 38. The control section 31 carries out the function of comprehensively controlling the operations of the file controller 30, and is configured to have a sequencer, etc. The control section 31 not only is provided with a control register 32 that indicates the unused condition of each bank of the file memory 40, but also carries out the function as a control section that updates and manages its contents.

The control information area 34 has a root directory 35 that is referred to by the file system 12 and the control table 36. The file names and their starting bank numbers are stored with correspondence established between them in the root directory 35 for each file stored in the file memory 40. The control table 36 has registered in it the link information for logically connecting the plurality of banks constituting each file.

The address translation section 38, at the time the sub CPU 21 of the sub control section 20 stores data in the file memory 40 via the file controller 30, has the function of converting the address signals input from the sub CPU 21. The control section 31 generates the control signals related to the read or write operation of data to the file memory 40. Further, it carries out not only the function of carrying out rewriting while achieving agreement between the contents of the control register 32, the root directory 35, and the control table 36 at the time of data storing operation or data erasing operation, but also the function of indicating the contents of address translation to the address translation section 38. In other words, the control section 31 has the function of a data storage control section that controls the storage destination at the time of storing the data from the sub CPU 21 in the file memory 40, that is, of storing data from the sub control section 20 via the file controller 30 in the file memory 40 while referring to the information saved in the control register 32, and the function of managing the storage information (root directory 35 and control table 36) for reading out the data from the file memory 40, that is, the function of a storage information control section that generates and stores the storage information.

Further, in the information processing apparatus 5, the sub control section 20 carries out only the operation of storing data in the file memory 40, and the main control section 10 carries out only the operation of reading the data from the file memory 40 and the operation of erasing the data.

Figure 2:
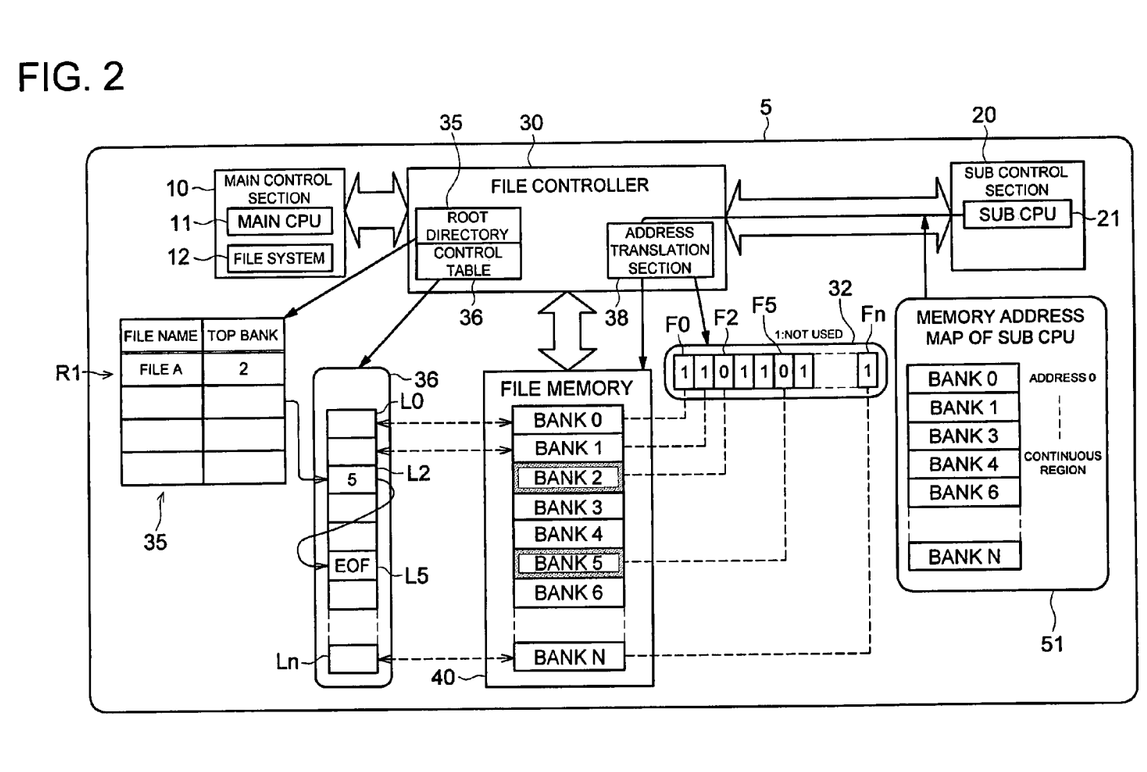
FIG. 2 is an explanatory diagram showing the internal state when only file A has stored in the file memory of the information processing apparatus according to the first preferred embodiment of the present invention.

FIG. 2 shows the internal state of the file memory 40 and the file controller 30 when only file A has been stored. In the root directory 35 shown in the example of FIG. 2, the root information R1 indicating the presence of file A and that its starting bank (divided region) is Bank 2 is registered. The control table 36 is provided with the link information storage areas L0 to Ln having a one-to-one correspondence with each bank sequentially starting from Bank 0 to Bank n. Each link information storage area L0 to Ln has registered in it the bank number of the next bank within that file. Further, when that bank is the terminating bank of the file, a prescribed termination information (the EOF (End Of File) mark in the figure) is registered in the link information storage area of that bank.

In the example of FIG. 2, the root information R1 registered at the beginning of the root directory 35 indicates the presence of file A and that its starting bank is Bank 2, and the link information storage area L2 corresponding to Bank 2 indicates that the next bank is Bank 5, and the link information storage area L5 corresponding to Bank 5 indicates that this bank is the terminating bank of the file.

The control register 32 is configured to have, sequentially from left to right, the flags F0 to Fn having a one-to-one correspondence to each of the banks (divided region) from Bank 0 to Bank n. Each of the flags F0 to Fn indicates whether or not the corresponding bank is unused (vacant) with a value "1" indicating the unused (vacant) state and a value "0" indicating the in-use state. In the control register 32 shown in the example of FIG. 2, since only the flag F2 and the flag F5 are "0", this indicates that only Bank 2 and Bank 5 are being used and that the other banks are not being used.

The address translation section 38 carries out the function of converting the address signals input from the sub CPU 21 so that a prescribed contiguous address space on the side of the sub CPU 21 of the sub control-section 20 is allocated to the address space corresponding to each unused divided region in the file memory 40. Further, as seen from the side of the sub CPU 21, the address translation is done so that the used banks are skipped and only unused banks appear to be present with successive addresses from Bank 0. The memory address map 51 shown in the extreme right part of FIG. 2 indicates the positioning of each bank (sequence of arrangement) as seen from the contiguous address space on the side of the sub CPU 21. In this example, since Bank 2 and Bank 5 are in use, by carrying out address conversion using the address translation section 38, the contiguous address space on the side of the sub CPU 21 appears as an address space with an arrangement of Bank 0, Bank 1, Bank 3, Bank 4, Bank 6, . . . Bank n.

Figure 3:
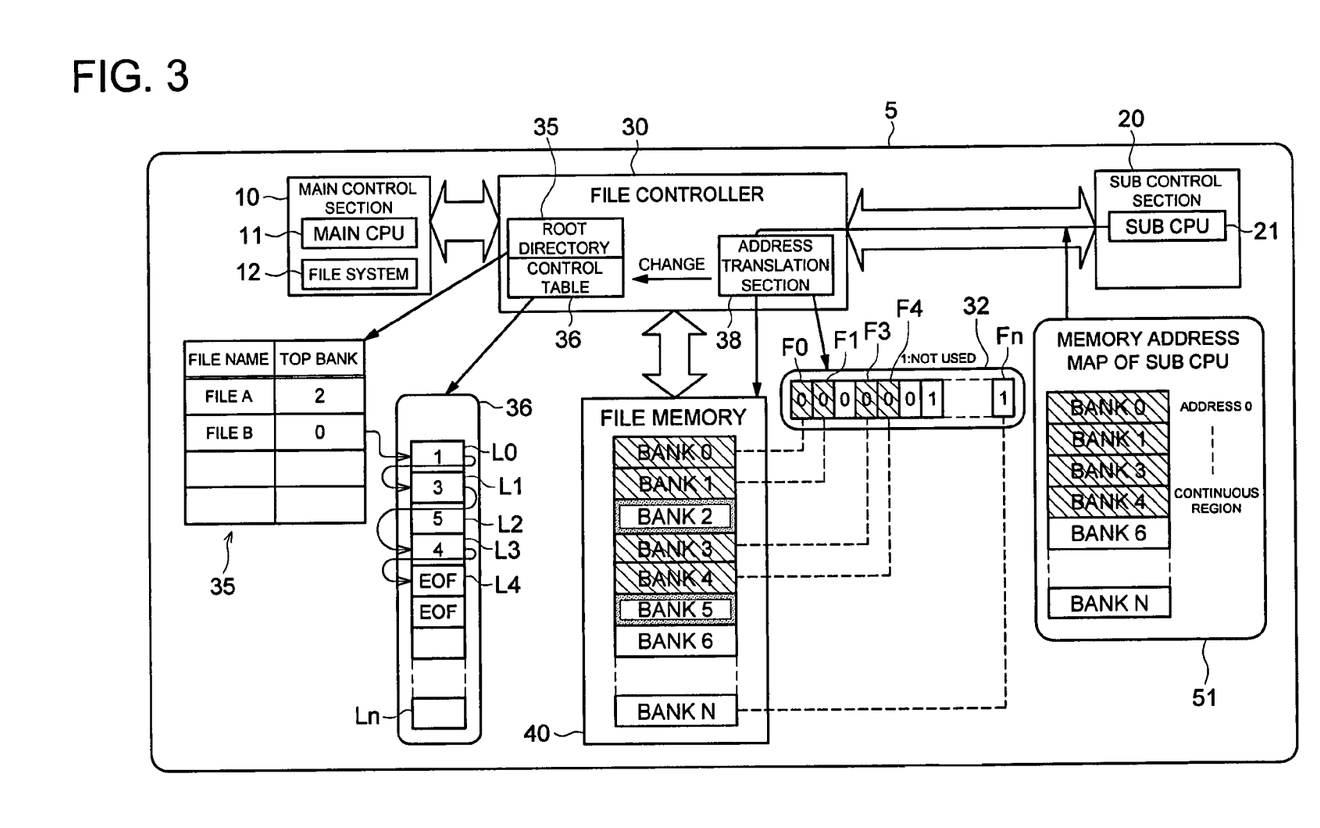
FIG. 3 is a an explanatory diagram showing the status when the sub CPU of the sub control section writes four banks of data in the file memory via the file controller from the state shown in FIG. 2.

FIG. 3 indicates the state in which the sub CPU 21 has written four banks of data in the file memory 40 from the state shown in FIG. 2. Because the address signals input from the sub CPU 21 to the file controller 30 are converted by the address translation section, the data of four banks starting from the beginning (for example address location 0) of the contiguous address space on the side of the sub CPU 21 are stored within the file memory 40 distributing them in four banks 0, 1, 3, and 4.

The file controller 30 updates the contents of the control register 32, the root directory 35, and the control table 36 according to the writing of data from the side of the sub CPU 21. In other words, the value "0" is written in the flags F0, F1, F3, and F4 corresponding to the banks 0, 1, 3, and 4 in the control register 32. In addition, for example, the name "File B" and the information that the bank number of its starting bank is "0" is registered in the root directory.

In addition, the control table 36 is updated so that it indicates that File B is made up of four banks, from the beginning, Bank 0, Bank 1, Bank 3, and Bank 4, and also that Bank 4 is the last bank of that file. In specific terms, the bank number "1" is registered in the link information storage area L0, the bank number "3" in the link information storage area L1, the bank number "4" in the link information storage area L3, and the data "EOF" indicating end is registered in the link information storage area L4.

Further, the sub CPU 21 identifies how many unused banks are present by reading the control register 32 before carrying out data write to the file memory 40, grasps the volume of data that can be written afresh in the file memory 40, and writes the data within the address range corresponding to that volume of data. Further, when the address signals input from the sub CPU 21 indicate an address outside the address range corresponding to the unused banks, the file controller 30 does not carry out the writing operation to the file memory 40.

Figure 4:
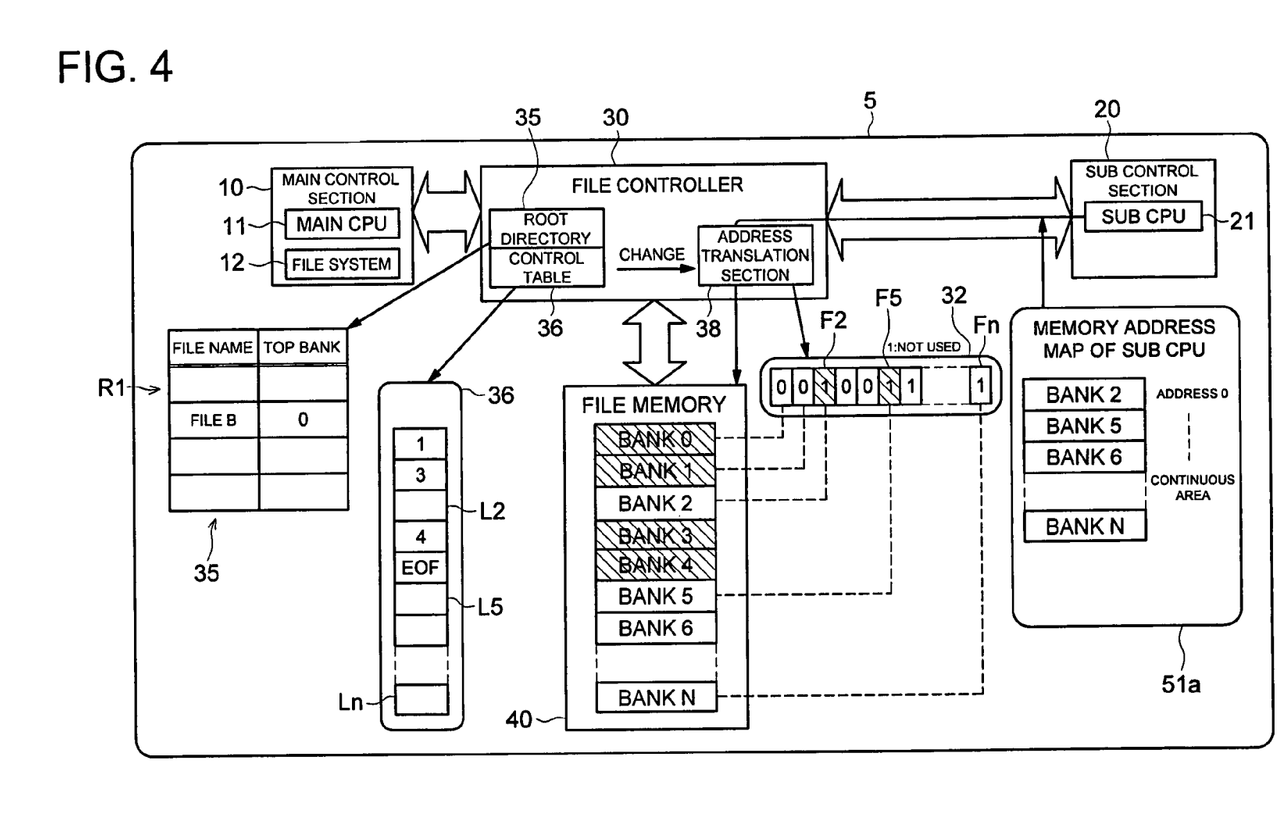
FIG. 4 is an explanatory diagram showing state when the main control section has deleted the file A from the state shown in FIG. 3.

FIG. 4 shows the state when the File A has been deleted by the main control section 10 from the state shown in FIG. 3. When the main control section 10 issues the delete command to the file controller 30 to delete File A, the file controller 30 identifies which are the banks that constitute File A from the contents registered in the root directory 35 and the control table 36, and changes the flags in the control register corresponding to those banks to "1". In this example, since File A is constituted by Banks 2 and 5, a "1" is written in the flag F2 and in the flag F5.

Further, among the entries in the control table 36, the contents registered in the link information storage areas L2 and L5 corresponding to the banks constituting File A are cleared. Thereafter, the root information R1 related to File A is deleted from the root directory. Here, the target file of the delete instruction can be specified by its file name, or can be specified by a number indicating its sequential number from the beginning entry in the root directory 35. Further, it is also possible to have a configuration in which the main control section 10 deletes the file by directly rewriting either the root directory 35 alone or the root directory 35 and the control table 36. In this case, at the time of these operations it is possible to carry out the updating of the control register 32 by the control section 31.

When a file is deleted, the control section 31 sets again the contents of address conversion for the address translation section so as to correspond to the status of the presence of unused banks after erasing. As a result, as is shown in the memory address map 51a in FIG. 4, the unused banks are placed in the sequence of Bank 2, Bank 5, Bank 6, . . . , Bank n so that it appears as a contiguous address space as seen from the side of the sub CPU 21.

In the above manner, by using the file controller 30, even when the main control section 10 has stopped operating, the sub CPU 21 of the sub control section 20 can store data in the unused area of the file memory 40. Further, at this time, since the address conversion is made by the address translation section 38 so that only the unused banks are reflected in a contiguous address space as seen from the sub CPU 21, the sub CPU 21 writes as if it is writing in a normal memory having a contiguous storage area, and it is possible to store data in unused banks present at non-contiguous locations in the file memory 40. As a consequence, the sub CPU 21 can store data in the file memory 40 without having to use the file system.

In addition, the main control section 10, by referring to the root directory 35 and the control table 36 in the file controller 30, can handle the data stored in the file memory 40 as a file under the control of the file system 12. In other words, the sequence of data written in the file memory 40 as if the sub CPU 21 is writing it in a contiguous address space can be read out from the file memory 40 as the original sequence of data.

Figure 5:
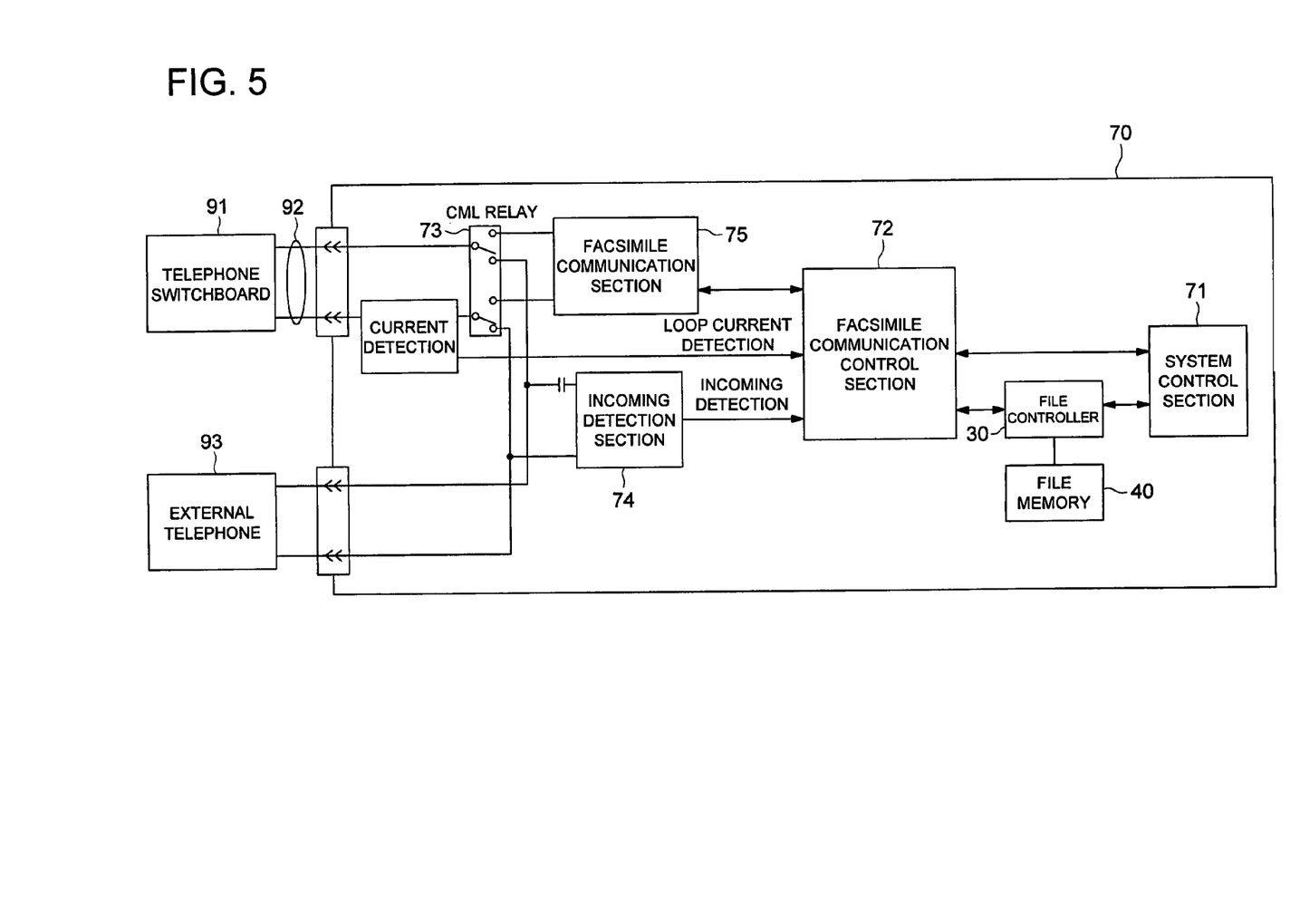
FIG. 5 is a block diagram showing an multi-functional apparatus as a concrete example of the information processing apparatus according to the first preferred embodiment of the present invention.

FIG. 5 shows the configuration of a multi-functional apparatus 70 as a concrete example of an information processing apparatus 5. The multi-functional apparatus 70 is an image forming apparatus provided with the copying function, the printer function, the facsimile function, etc. The multi-functional apparatus 70 has a system control section 71 provided with a first control section and a facsimile communication control section 72 provided with a second control section. Further, a file controller 30 and a file memory 40 are provided for transferring received data between these. The system control section 71 carries out comprehensive control of the operations of the entire all-in-unit 70, and the facsimile communication control section 72 functioning as a sub control section 20 takes charge of the control of communication protocols related to facsimile communication. The system control section 71 goes into the power saving mode and enters the operation stopped state when the multi-functional apparatus 70 goes into the standby state.

Further, the system control section 71, the facsimile communication control section 72, file controller 30, and the file memory 40 correspond respectively to the main control section 10, the sub control section 20, the file controller 30, and file memory 40 of FIG. 1, and have similar configurations as in FIG. 1, unless otherwise specified.

The connection of the telephone lines 92 from the telephone exchange 91 is selected between an external telephone instrument 93 and the facsimile communication section 75 by a CML (Connect MODEM to Line) relay 73, and the external telephone instrument 93 is connected to the telephone lines 92 in the normal state when no facsimile communication is carried out.

When there is an incoming call, the external telephone instrument 93 rings in accordance with the ringing signal from the telephone exchange 91. At this time, the incoming call detection section 74 detects that there is an incoming call, and notifies this information to the facsimile communication control section 72. The facsimile communication control section 72 refers to the control register 32 of the file controller 30, checks whether or not there is a vacant space in the file memory 40 of size more than a pre-determined receivable data volume, and rejects facsimile reception if such a space is not available. The receivable data volume is set, for example, taking the standard image data volume of 1 page as the reference. Further, the vacant space can also be judged by the sub CPU 21 carrying out a dummy write operation in the file memory 40 and using the result of that operation for that judgment.

The facsimile communication control section 72, when there is a vacant space in the file memory 40 of size more than a pre-determined receivable data volume, switches the CML relay 73 to the side of the facsimile communication section 75 after the set number of ringing signal have been received, and carries out the reception operation independently. The external telephone instrument 93 stops ringing due to the switching of the CML relay 73.

When the facsimile communication control section 72 starts the reception operation, it notifies that information to the system control section 71. Upon receiving this notification, the system control section 71 starts the recovery operation if it is in the power saving mode.

Without waiting for the recovery of the system control section 71, the facsimile communication control section 72 executes independently the facsimile reception operation, and writes the received data in the file memory 40 via the file controller 30. At this time, the facsimile communication control section 72 can write the received data sequentially form the beginning as if it is writing into a contiguous address space without giving any consideration to the positions of unused banks within the file memory 40. In accordance with this writing of the received data, the file controller 30 updates the control register 32 and the root directory 35, and the contents of the control table 36, as is shown in the example of FIG. 3.

The system control section 71 that has recovered from the power saving mode refers to the root directory 35 (see FIG. 1) and the control table 36 (see FIG. 1) of the file controller 30 using the file system 12 (see FIG. 1), identifies in which bank was the received data stored, reads that received data as a file and prints it out. When the print output is completed, the system control section 71 deletes that file from the file memory 40. In order to put the specified file in the deleted state, the file controller 30 updates the contents of the control register 32 (see FIG. 1), the root directory 35 (see FIG. 1), and the control table 36 (see FIG. 1), as is, shown in the example in FIG. 4. Further, the setting of the address translation section 38 (see FIG. 1) is changed after this updating so that the unused banks appear as a contiguous address space as viewed from the sub CPU 21.

In this manner, by receiving and handing over the received data via the file controller 30 and the file memory 40, even in the state when the system control section 71 is in the power saving mode and is not operating, it is possible for the facsimile communication control section 72 to carry out reception operation independently, and to store that received data in the file memory as if writing in a usual memory. Further, the system control section 71 after recovery can read out as a file the received data stored in the file memory 40 by referring to the root directory 35 and the control table 36 within the file controller 30.

In addition, since it is possible for the facsimile communication control section 72 to carry out reception operation independently without waiting for the system control section 71 to recover, it is possible to solve the problem present in the conventional apparatus of the external telephone instrument 93 continuing to ring beyond the set number of times during the period of the system control section 71 recovering from the power saving mode and receiving the off-hook notification (reception enabled).

Figure 6:
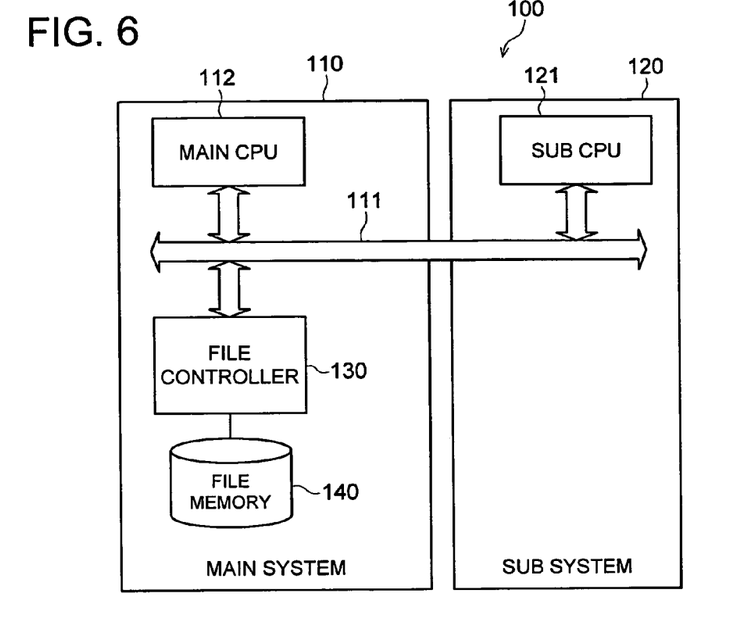
FIG. 6 is a block diagram showing an outline configuration of the information processing apparatus according to the second preferred embodiment of the present invention.

FIG. 6 shows an outline configuration of the information processing apparatus 100 according to the second preferred embodiment of the present invention. The information processing apparatus 100 is provided with a main system 110 and a sub system 120. The main system 110 is configured to have a main CPU 112 connected to the bus 111 as the first control section, a file controller 130 connected to the bus 111, and a file memory 140 connected below the file controller 130. The sub system 120 is provided with a sub CPU 121 connected to the bus 111 of the main system 110. The main CPU 112 and the sub CPU 121 can respectively access the file controller 130 via the bus 111.

Figure 7:
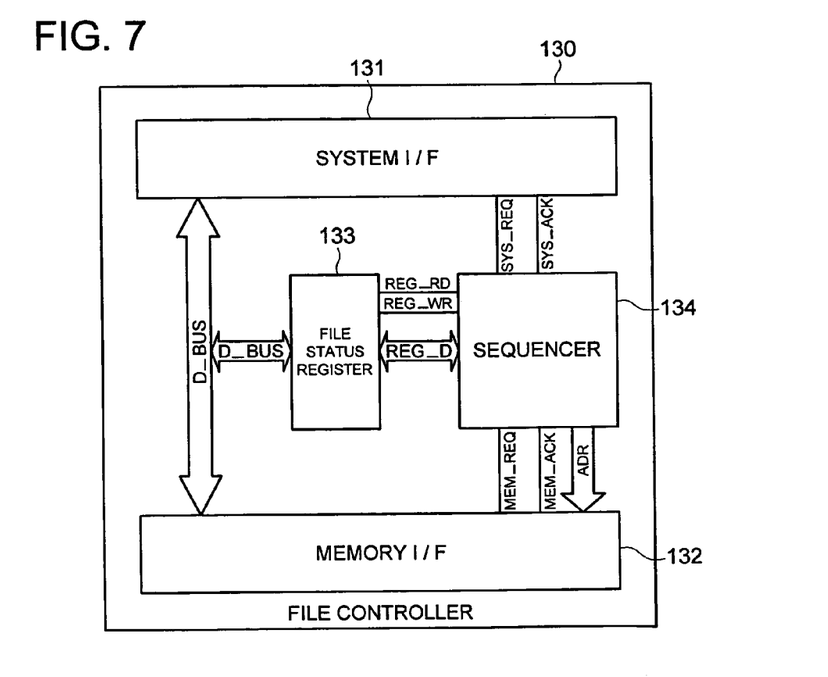
FIG. 7 is a block diagram showing the configuration of the file controller of the information processing apparatus according to the second preferred embodiment of the present invention.

FIG. 7 shows the configuration of the file controller 130. The file controller 130 is provided with a system I/F (Interface) section 131 for interfacing with the devices on the side of the bus 111 such as the main CPU 112 and the sub CPU 121, a memory I/F section 132 for interfacing with the file memory 140, a file status register 133, and a sequencer 134. The sequencer 134 is a circuit that not only updates the file status register 133 but also executes accesses to the file memory 140 by generating the address signals and the read/write control signals for the file memory 140.

Figure 8:
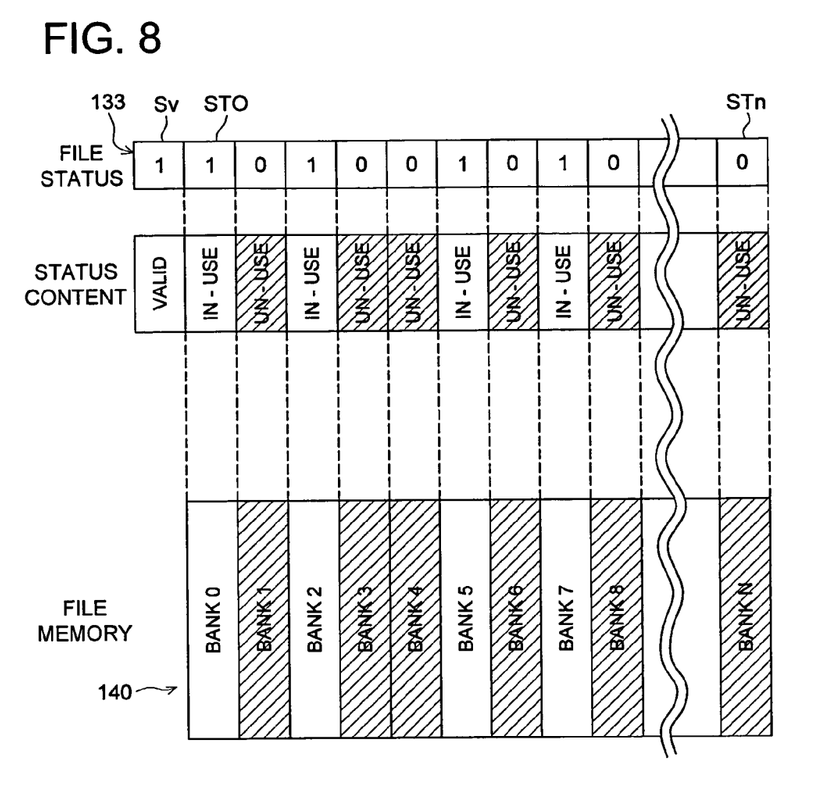
FIG. 8 is an explanatory diagram showing the relationship of correspondence between the file status register and file memory of the file controller.

FIG. 8 shows correspondence relationship between the file status register 133 and the file memory 140. The file memory 140 is used by dividing it into a plurality of divided region (banks) from Bank 0 to Bank n similar to the case of the first preferred embodiment. The valid bit Sv at the beginning of the file status register 133 indicates the valid or not valid state of the file status register 133 wherein a value "1" indicates that it is valid and a value "0" indicates that it is not valid. Further, each of the second and subsequent bits ST0 to STn have a one-to-one correspondence with the banks within the file memory 140, with a value "1" indicating that the bank is under use and a value "0" indicating that the bank is not in use.

The sequencer 134 of the file controller 130 functions as a modification section that, when there was a data written in the file memory 140 from the system I/F section 131 during the period in which the leading valid bit Sv of the file status register 133 has been set to "1" (valid), that modifies the bit in the file status register 133 corresponding to the bank in which data was written to "1" (in use) or "0" (un-use).

Next, the operations are explained below at the time of transferring data from the sub system 120 to the main system 110 via the file memory 140 when the main CPU 112 is in the power saving (Sleep) mode.

Further, here, it is assumed that the information processing apparatus 100 is an multi-functional apparatus, the main system 110 is its system control section, the main CPU 112 is the CPU of the system control section, and the sub system 120 is the facsimile communication control section. Further, a description is given here for the example in which facsimile reception occurs when the main CPU 112 is in the power saving mode and that received data is stored in the file memory 140 by the sub CPU 121.

Figure 9:
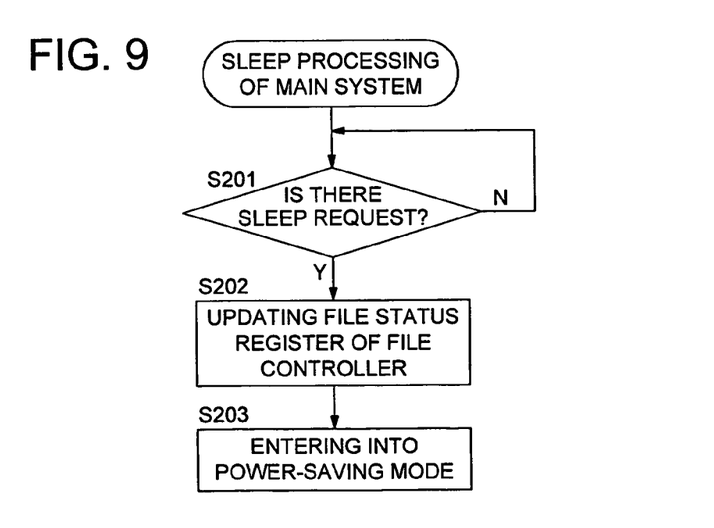
FIG. 9 is a flow diagram showing the processing at the time the main CPU transits to the power saving mode in the information processing apparatus according to the second preferred embodiment of the present invention.

FIG. 9 shows the flow of processing at the time the main CPU 112 of the main system 110 transits to the power saving mode. When the main CPU 112 transits to the power saving mode (Y in Step S201), it updates the file status register 133 of the file controller 130 (Step S202), and thereafter, sleeps by entering the power saving mode (Step S203).

In detail, the main CPU 112 monitors through a file system, not shown in the figure, which data has been stored in which bank of the file memory 140. Further, at the time of transiting to the power saving mode, it sets in the file status register 133 the information expressing the in-use or not-used status of each bank at that time. In addition, it stores the information set in the file status register 133 in a prescribed memory location. Thereafter, it modifies the leading valid bit Sv to "1" (valid), and enters the power saving mode. Further, before entering the power saving mode, it is also possible for the main CPU to inform the sub CPU 121 of the sub system 120 that it is entering the power saving mode and the remaining capacity (free space) in the file memory 140.

Figure 10:
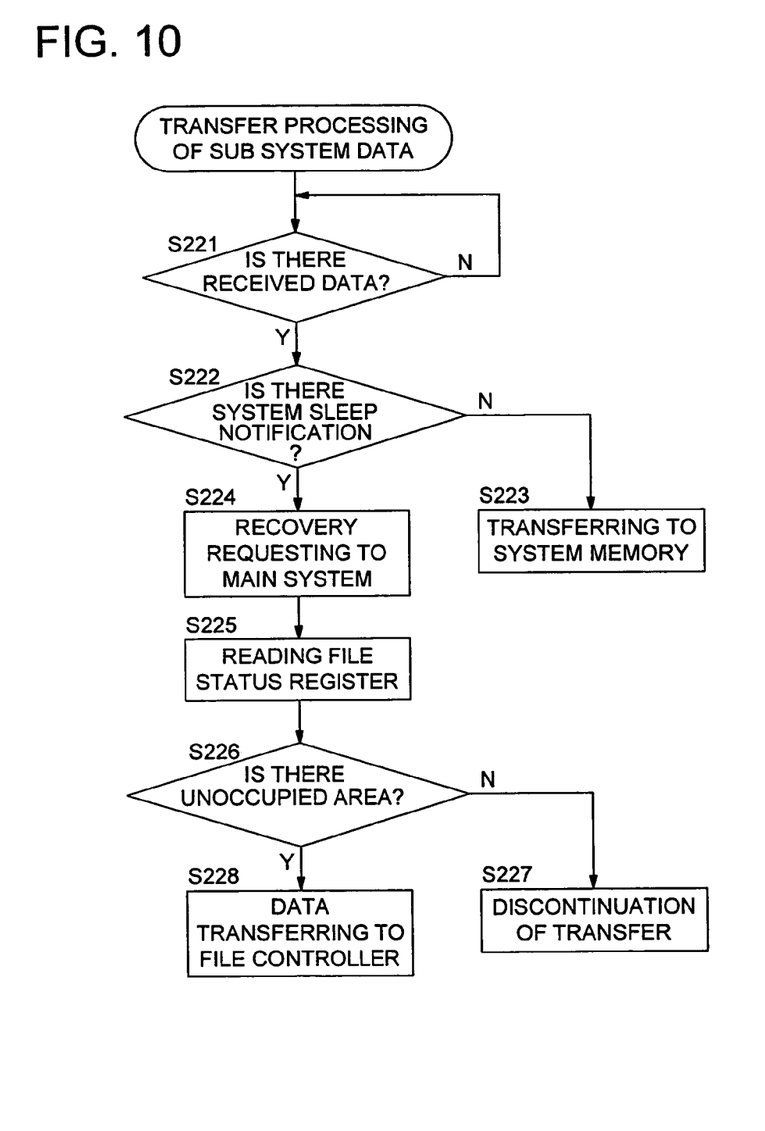
FIG. 10 is a flow diagram showing the processing on the sub system side in the information processing apparatus according to the second preferred embodiment of the present invention.

FIG. 10 shows the flow of operations in the sub system 120. The sub CPU 121 of the sub system 120, when there is an incoming call over the telephone lines (Y in Step S221), verifies whether or not the main CPU 112 is in the power saving mode (Step S222), if it is not in the power saving mode (N in Step 5222), transfers the received data to the system memory, not shown in the figure, within the main system 110 (Step S223). Whether or not it is in the power saving mode is judged, in the case of the main CPU 112 receiving that notification, by whether or not the reception of that notification is present. Further, in a configuration in which the notification is not received, it is possible to judge using the method of transmitting a prescribed command to the main CPU 112 and judging from whether or not there is a response to it, or using the method of judging the presence or absence of the signal in the case in which a prescribed signal is output at regular intervals by the main CPU 112. The judgment method can be any method.

When the main CPU 112 is in the power saving mode (Y in Step S222), not only a request for recovery form the power saving mode is transmitted to the main CPU 112 (Step S224), but also the file controller is accessed and the file status register 133 is read out (Step S225). The sub CPU 121 identifies the not used status of each of the banks of the file memory 140 based on the information read out from the file status register 133, and judges whether or not there is a remaining area in the file memory 140 that is more than a predetermined receivable volume of data (Step S226). If there is no remaining area more than the receivable volume of data (N in Step S226), the transfer of received data to the main system 110 is aborted, and the facsimile reception is terminated (Step S227).

When there is a remaining area more than the receivable volume of data (Y in Step S226), the received data is stored in the file memory 140 via the file controller 130 (Step S228).

At this time, the sub CPU 121 specifies to the file controller 130 the bank that is to be the storage destination for the data, and the file, controller 130 stores the data input from the sub CPU 121 in the specified bank. Every time the data of one bank is written, the sub CPU 121 specifies the next bank.

Normally, since unused banks are present at non-contiguous locations, the sub CPU 121 identifies the not used status of each of the banks of the file memory 140 based on the information read out from the file status register 133, and operates so as to specify the unused banks sequentially starting from Bank 0 and stores the data. In addition, the sequencer 134 of the file controller 130 writes a "1" in the bit inside the file status register 133 corresponding to the bank in which the data from the sub CPU 121 was stored.

Figure 11:
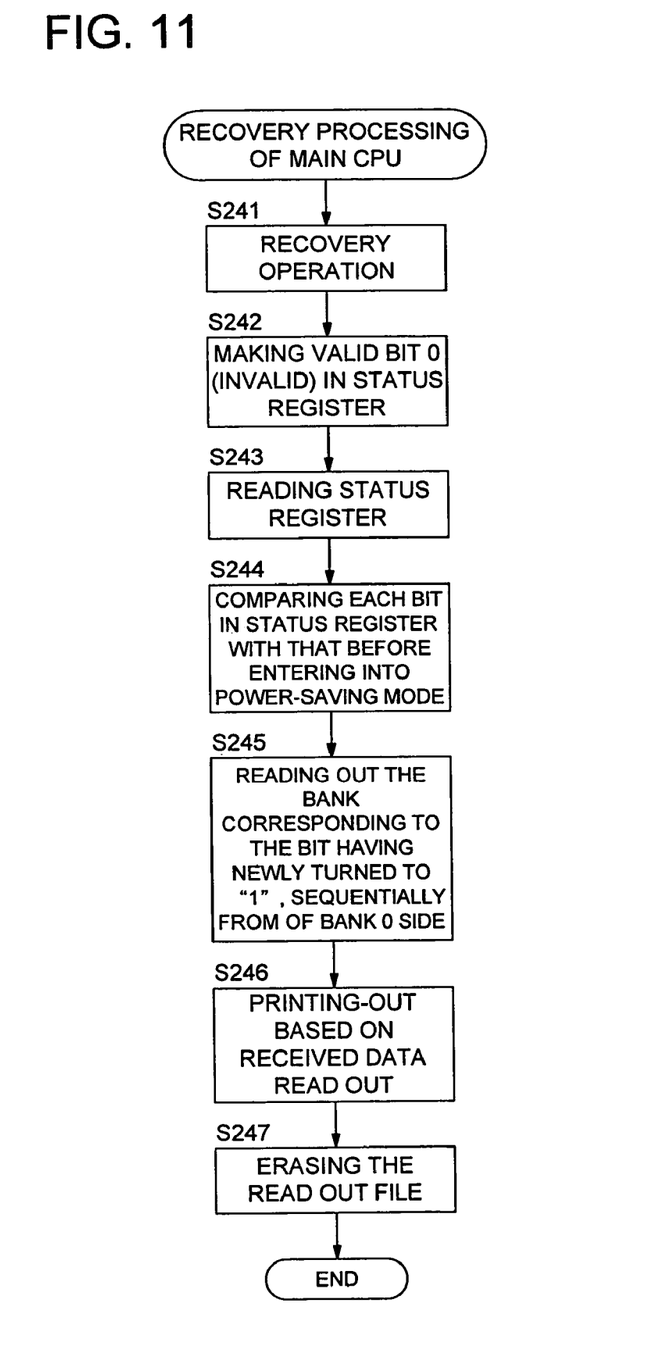
FIG. 11 is a flow diagram showing the operation of the main CPU at the time of recovering from the power saving mode.

FIG. 11 shows the operation of the main CPU 112 at the time of recovering from the power saving mode.

Upon receiving a recovery request from the sub system 120, the main CPU 112 starts the operation of recovery from the power saving mode (Step S241). It takes, for example, about 30 seconds for recovery due to the initialization of the OS or of the various I/O (Input/Output) devices. After the main CPU 112 has recovered from the power saving mode, it accesses the file controller 130 and rewrites the leading valid bit Sv of the file status register 133 to "0" (not valid) (Step S242). In addition, it reads the second and subsequent bits (the part indicating the in-use or not-used status of each bank of the file status register 133 (Step S243).

Further, the contents set in the file status register 133 at the time of transiting to the power saving mode last time is compared with the content of the file status register 133 read out after recovery from the power saving mode (Step S244). As a result of this comparison, if there is any bit that has become "1" newly it corresponds to a bank in which data received from the sub CPU 121 has been written during the power saving mode of the main CPU 112. Since the order of storing data has been determined to be the ascending order starting from Bank 0, the banks corresponding to the bits that have become "1" newly are read out successively from Bank 0 (Step S245). Because of this, it is possible to read out the sequence of received data stored by the sub CPU 121 in the original order.

The print output operation is made based on the received data read out in this manner (Step S246), and the corresponding file is deleted from the file memory 140 (Step S247). The deleting is done by writing a "0" in the bit of the file status register 133 corresponding to the banks of the file. Further, at this instant of time, it is also possible merely to update the memory, not shown in the figure, in the main system 110 that controls the usage status of the file memory 140, and to set the file status register 133 so as to reflect the contents of this deleting at the time of entering the power save mode next time.

Further, if facsimile reception is present when the main CPU 112 is in the normally operating state, the notification of the reception is made from the sub CPU 121 to the main CPU 112, and the sub CPU 121 receives from the main CPU 112 the specification of the storage address for the received data in answer to this notification. The storage destination is the working storage in the main system 110, and the sub CPU 121 transfers the received data to that destination.

The main CPU 112 of the main system 110 hands over the received data transferred and stored in the working storage by the sub CPU 121 of the sub system 120 to the file system. The file system specifies the bank of the storage destination and transfers the received data to the file controller 130. The file controller 130 stores that received data in the specified bank. The file control information corresponding to the information registered in the root directory 35 and the control table 36 of the first preferred embodiment is being controlled by the file system of the main system 110.

In this manner, by using the file controller 130 and the file memory 140, even when the main CPU 112 has gone into the power saving mode, the sub system 120 carries out the facsimile reception operations independently, and it is possible to transfer that received data to the main system via the file memory 140. In addition, in the second preferred embodiment, since the processings related to the management of the root directory 35 and the control table 36 that were being carried out by the file controller 130 in the first preferred embodiment are being made to be carried out by the main CPU 112, the configuration of the file controller 130 becomes simplified. Further, since the file status register 133 is being read out by the sub CPU 121 and the storage destination of the received data is being controller, the configuration of the file controller 130 becomes simplified.

In the above, although some preferred embodiments of the present invention were explained using the drawings, the concrete configuration need not be restricted to those shown in the preferred embodiments, but any modifications or additions within the intent and scope of the present invention shall be included in the present invention.

For example, in the first preferred embodiment, although the configuration was one in which the data was stored automatically in unused banks using the address translation section 38, it is also possible to have a configuration in which the sub CPU 21 identifies the unused banks by referring to the control register 32 and the determination of in which unused bank is the data to be stored is made by the sub CPU 21. Further, it is also possible to have a configuration in which the sub CPU 21 identifies the unused banks be referring to the control register 32, and the setting of the address translation section 38 is made by the sub CPU 21 so that the unused banks appear to be in a contiguous address space.

Although in the second preferred embodiment, the sub CPU 121 identifies the unused banks by reading the file status register 133, and the sub CPU 121 gives an instruction to the file controller 130 as to in which banks the data is to be stored, it is also possible to have a configuration in which the file controller 130 selects automatically the bank in which the data is to be stored and stores the data in it. For example, it is possible to have a configuration in which the sequencer 134 automatically selects the unused banks sequentially from Bank 0 by referring to the file status register 133.

Further, in the preferred embodiments, although an example was given of an apparatus having the facsimile communication control section 72 in the sub system, an apparatus would be an ideal target of the present invention if the sub system operates independently when the main system has stopped its operations, and also the data during that independent operation is transferred from the sub system to the main system.

Further, although in the preferred embodiments the main systems 10 and 110 were made to recover from the power saving mode while independent reception is made in the sub systems 20 and 120, it is not necessary always to recover the main system from the power saving mode. For example, memory reception can be continued at night with the main systems 10 and 110 remaining in the power saving mode. In this case, in order to carry out reception several times, it is good to retain some kind of reception log in the sub systems 20 and 120. From this reception log, the main systems 10 and 110 can identify that received data of several receptions have been stored in the file memories 40 and 140. In particular, if the size information of the received data during each reception is retained as a part of the reception log, it is possible to identify accurately the boundaries between the received data by the main systems 10 and 110.

The configurations of the file controllers 30 and 130 need not be restricted to the example shown in the first and second preferred embodiments. For example, it is possible to have a configuration in which the control register 32 or the root director 35, and the control table 36 are made a part of the area of the file memory 40.

Further, it is not necessary to limit to transferring the data from the sub system to the main system, and it is possible to have a configuration in which data can be transferred from the main system to the sub system. For example, the data written in non-contiguous banks within the file memory 40 by the main control section 10 under the control of the file system 12 can be made to be read out from contiguous addresses by the sub CPU 21.

Apart from this, it is also possible to have a configuration in which the file memories 40 and 140 are used for storing provisionally the data received independently by the sub systems 20 and 120 during the power saving modes of the main systems 10 and 110, after recovering from the power saving mode, the data in the file memories 40 and 140 is transferred to a large capacity storage apparatus such as a hard disk drive apparatus, and the data is controlled by a different file system.

According to the information processing apparatus and the file controller of the present invention, since the information indicating the unused state of each divided region within the file memory is controlled by the file controller, even in the condition in which the first control section that controls the file memory is not working, it is possible to store the data in the free space within the file memory using the file controller by the second control section.

Further, since the information indicating the unused status of each divided area of the file memory is controlled by the file controller, the interface becomes simplified between the first control section and the second control section related to the control of the file memory.

In addition, the first control section can carry out data management using the file system even for the data stored in the file memory by the second control section in a condition in which that first control section is not operating, it is possible to carry out unified data management using the file system.

In particular, when the first control section is the system control section of the image forming apparatus and the second control section is the facsimile communication control section, even when the system control section is in the power saving mode, since the facsimile communication control section can start the reception operation independently and can store the received data in the file memory, it is possible to prevent the external telephone instrument from ringing beyond the set number of times.

It is to be noted that various changes and modifications will be apparent to those skilled in the art. Therefore, unless such changes and modifications depart from the scope of the present invention, they should be construed as being included therein.

What is claimed is:

1. An information processing apparatus, comprising:
a file memory to store data;
a file controller to access the file memory wherein the file controller includes a register to store information representing un-use condition in each divided region of the file memory;
a first control section to manage the file memory via the file controller;
a second control section connected with the file controller;
a data storing control section to store the data sent from the second control section via the file controller based on the information representing un-use condition into the divided region under the un-use condition in the file memory when the first control section is under un-operative and condition; and
an information update section to update the information stored in the register such that the divided region storing the data is shown to be under use condition,
wherein the first control section stores the information representing un-use condition to the register when the first control section moves into the un-operative condition,
wherein, when recovering from the un-operative condition, the first control section recognizes the divided region storing the data from the second control section, based on a difference between the information stored before moving into the un-operative condition and the information updated by the information update section, and
the first control section executes an information processing on the data stored in the divided region storing the data from the second control section.

2. The information processing apparatus of claim 1, wherein the file controller includes the data storing control section.

3. The information processing apparatus of claim 1, wherein the data storing control section selects the divided regions under the un-use condition as storing regions in a predetermined allocation order, and stores a series of data into the storing regions in the predetermined allocation order.

4. The information processing apparatus of claim 3, wherein the first control section reads out the series of data stored in the divided regions in the predetermined allocation order.

5. The information processing apparatus of claim 1, wherein the second control section functions as the data storing control section.

6. The information processing apparatus of claim 1, wherein the first control section is a system control section of the apparatus, and the second control section is a facsimile communication control section.

* * * * *